UNITED STATES PATENT OFFICE.

WALTER RENTON INGALLS AND FRANCIS WYATT, OF NEW YORK, N. Y.

PROCESS OF TREATING COMPLEX OR SULPHIDE ORES.

SPECIFICATION forming part of Letters Patent No. 497,473, dated May 16, 1893.

Application filed December 28, 1892. Serial No. 456,561. (No specimens.)

*To all whom it may concern:*

Be it known that we, WALTER RENTON INGALLS, a citizen of the United States, and FRANCIS WYATT, a subject of the Queen of England, residents of New York city, New York, have invented certain new and useful Improvements in Processes of Treating Complex Sulphide Ores, of which the following is a specification.

In the pending application we have described a process in which sulphuric acid and sodium carbonate are used as chemical reagents, the latter being recovered at the expense of other comparatively cheap reagents, so that the same quantity of carbonate of soda is used continuously in the process, without substantial diminution. We have now devised a process for the treatment of complex sulphide ores in which not only is the carbonate of soda recovered but also the sulphur of the sulphuric acid used as a lixiviant, and in which process nothing is wasted except the natural impurities found in the substances employed.

The operation of our improved process is as follows: The complex sulphide ore previously reduced to a proper size, as usual in smelting, is first roasted in a suitable furnace, for the purpose of sulphatizing the zinc. The sulphurous acid driven out by this process is collected in a lead chamber, where it is converted into sulphuric acid in the usual manner. This sulphuric acid with water is then applied to the roasted ore to lixiviate it. By this treatment the zinc sulphate is dissolved, and the other ingredients including the lead, iron and silver form a residue which is handed over to the lead smelter to be treated by any of the known processes of smelting simple lead ore. If any iron by reason of its solubility entered the zinc sulphate solution, it is to be precipitated therefrom by the addition of a small quantity of zinc oxide obtained at a later stage of the process and the zinc thus freed from the iron is then precipitated in the form of zinc carbonate or a mixture of carbonate and hydroxide by the addition of carbonate of soda which was originally obtained from an outside source for the treatment of the first charge of ore, but which was recovered at a subsequent stage of the process for the treatment of all further charges. The zinc carbonate is washed, dried, and calcined until it is reduced to zinc oxide; a small quantity of which is used as before stated to precipitate the iron from the zinc sulphate solution, but the main body of which is converted into spelter in the usual way or marketed as oxide. When the zinc is withdrawn from the sulphate solution there remains a solution of sodium sulphate. This solution is evaporated to dryness and the sodium sulphate thus obtained is mixed with coal and with a small quantity of common salt or sodium chloride and then heated to form carbon monoxide and impure sodium sulphide. The carbon monoxide is burned to convert it into carbonic acid gas, which is carried to a tower or other suitable device to be hereinafter referred to. The impure sodium sulphide is leached and the solution decanted to free it from its impurities; and the sodium sulphide solution is then carried to the before mentioned tower there to be treated with carbonic acid gas to convert it into bi-carbonate of soda. The carbonic acid gas required for this purpose is obtained partly from the burning of the carbon monoxide before described, but chiefly by burning limestone in a separate kiln. The calcium oxide or lime resulting from this burning is a marketable product. An additional amount of carbonic acid gas comes back to said tower being recovered at a subsequent stage of the process. While the bi-carbonate of soda is thus obtained, the sulphur contained in the sodium sulphide is given off as sulphureted hydrogen, which upon being burned, produces sulphurous acid, which is carried to the lead chamber mentioned at the beginning of the process, where it unites with the sulphurous acid obtained from roasting the ore. As in this way all the sulphur originally in the ore has been recovered, there may be an excess of sulphuric acid over that required for treating the ore, in which case the excess may be sold. The bi-carbonate of soda is heated in a suitable furnace giving off carbonic acid, which is fed to the tower aforesaid. The sodium carbonate thus obtained replaces the sodium carbonate originally employed in precipitating the zinc from the zinc sulphate solution. It will thus be seen that this process is not only absolutely continuous, but that it is conducted without waste, and that the by-products obtained, namely, lime and sulphuric acid are of salable value.

We claim—

1. The process of treating complex sulphide ores, which consists first in subjecting the ore to a sulphatizing roasting and recovering the driven off sulphur in the form of sulphuric acid; second, lixiviating the roasted ore with said sulphuric acid and water, and removing the iron from the solution if necessary; third, precipitating the zinc from said solution in the form of carbonate or carbonate and hydroxide, by the use of sodium carbonate, and subsequently converting the same into zinc oxide; fourth, evaporating the sodium sulphate obtained from the zinc sulphate solution, and heating the same with sodium chloride and coal, to convert it into sodium sulphide; fifth, converting the sodium sulphide into bi-carbonate of soda by dissolving the same in water and treating the solution with carbonic acid gas and recovering the sulphur in the form of sulphuric acid as described; and lastly, converting the bi-carbonate of soda into sodium carbonate by heating the same, to drive off the hydrogen and carbonic acid gas, substantially as described and for the purposes specified.

2. The process of treating complex sulphide ores which consists: first in subjecting the ore to a sulphatizing roasting and recovering the driven off sulphur in the form of sulphuric acid; second, lixiviating the roasted ore with said sulphuric acid and water and removing the iron therefrom if necessary; third, precipitating the zinc from said solution in the form of carbonate or carbonate and hydroxide by the use of sodium carbonate and subsequently converting the same into zinc oxide; fourth, evaporating the sodium sulphate obtained from the zinc sulphate solution and heating the same with sodium chloride and coal to convert it into sodium sulphide; fifth, converting the sodium sulphide into bi-carbonate of soda by dissolving the same in water and treating the solution with carbonic acid gas; and lastly, converting the bi-carbonate of soda into sodium carbonate by heating the same to drive off the hydrogen and carbonic acid gas substantially as described and for the purposes specified.

3. The process of treating complex sulphide ores which consists: first in subjecting the ore to a sulphatizing roasting; second, lixiviating the roasted ore with water and sulphuric acid and removing the iron therefrom if necessary; third, precipitating the zinc from said solution in the form of carbonate or carbonate and hydroxide by the use of sodium carbonate and subsequently converting the same into zinc oxide; fourth, evaporating the sodium sulphate obtained from the zinc sulphate solution and heating the same with sodium chloride and coal to convert it into sodium sulphide; fifth, converting the sodium sulphide into bi-carbonate of soda by dissolving the same in water and treating the solution with carbonic acid gas and recovering the sulphur in the form of sulphuric acid as described; and lastly, converting the bi-carbonate of soda into sodium carbonate by heating the same to drive off the hydrogen and carbonic acid gas substantially as described and for the purposes specified.

4. The process of treating complex sulphide ores which consists: first in subjecting the ore to a sulphatizing roasting; second, lixiviating the roasted ore with water and sulphuric acid and removing the iron therefrom if necessary; third, precipitating the zinc from said solution in the form of carbonate or carbonate and hydroxide by the use of sodium carbonate and subsequently converting the same into zinc oxide; fourth, evaporating the sodium sulphate obtained from the zinc sulphate solution and heating the same with sodium chloride and coal to convert it into sodium sulphide; fifth, converting the sodium sulphide into bi-carbonate of soda by dissolving the same in water and treating the solution with carbonic acid gas; and lastly, converting the bi-carbonate of soda into sodium carbonate by heating the same to drive off the hydrogen and carbonic acid gas, substantially as described and for the purposes specified.

WALTER RENTON INGALLS.
FRANCIS WYATT.

Witnesses:
W. P. PREBLE, Jr.,
J. KENNEDY.